United States Patent
Falk et al.

(10) Patent No.: US 12,221,729 B2
(45) Date of Patent: Feb. 11, 2025

(54) MOTOR VEHICLE FLOOR COVERING, BOOT OR TRUNK COVERING OR LOAD COMPARTMENT COVERING HAVING A STRUCTURALLY NEEDLE-PUNCHED CARPET SURFACE

(71) Applicant: ADLER PELZER HOLDING GMBH, Hagen (DE)

(72) Inventors: Frank Falk, Albstadt (DE); Volkmar Schulze, Schierling (DE)

(73) Assignee: ADLER PELZER HOLDING GMBH, Hagen (DE)

( * ) Notice: Subject to any disclaimer, the term of this patent is extended or adjusted under 35 U.S.C. 154(b) by 419 days.

(21) Appl. No.: 17/423,391

(22) PCT Filed: Jan. 9, 2020

(86) PCT No.: PCT/EP2020/050378
§ 371 (c)(1),
(2) Date: Jul. 15, 2021

(87) PCT Pub. No.: WO2020/148145
PCT Pub. Date: Jul. 23, 2020

(65) Prior Publication Data
US 2022/0064832 A1 Mar. 3, 2022

(30) Foreign Application Priority Data
Jan. 15, 2019 (DE) .............................. 102019100916

(51) Int. Cl.
*D04H 1/46* (2012.01)
*B32B 1/00* (2006.01)
(Continued)

(52) U.S. Cl.
CPC ................. *D04H 1/46* (2013.01); *B32B 1/00* (2013.01); *B32B 5/022* (2013.01); *B32B 25/04* (2013.01);
(Continued)

(58) Field of Classification Search
CPC .......... D04H 1/46; D04H 1/58; D04H 1/4326; D04H 18/02; B32B 1/00; B32B 5/022;
(Continued)

(56) References Cited

U.S. PATENT DOCUMENTS

| | | | |
|---|---|---|---|
| 4,047,269 A * | 9/1977 | Lochner | D04H 18/00 28/109 |
| 2020/0173073 A1* | 6/2020 | Lehmann | D04H 1/46 |

FOREIGN PATENT DOCUMENTS

| | | |
|---|---|---|
| DE | 1785256 A | 1/1972 |
| DE | 3625473 A1 | 2/1988 |

(Continued)

OTHER PUBLICATIONS

Search Report dated Apr. 17, 2020 in corresponding International Application No. PCT/EP2020/050378, 5 pages, translated.
(Continued)

*Primary Examiner* — Matthew D Matzek
(74) *Attorney, Agent, or Firm* — MH2 TECHNOLOGY LAW GROUP LLP

(57) ABSTRACT

The object of the invention is a method of manufacturing a three-dimensionally shaped floor paneling, luggage compartment paneling or load floor paneling for motor vehicles, the carpet surface of which has a needled structure on the visible side, as well as the panellings themselves.

3 Claims, 3 Drawing Sheets

Figure 1:
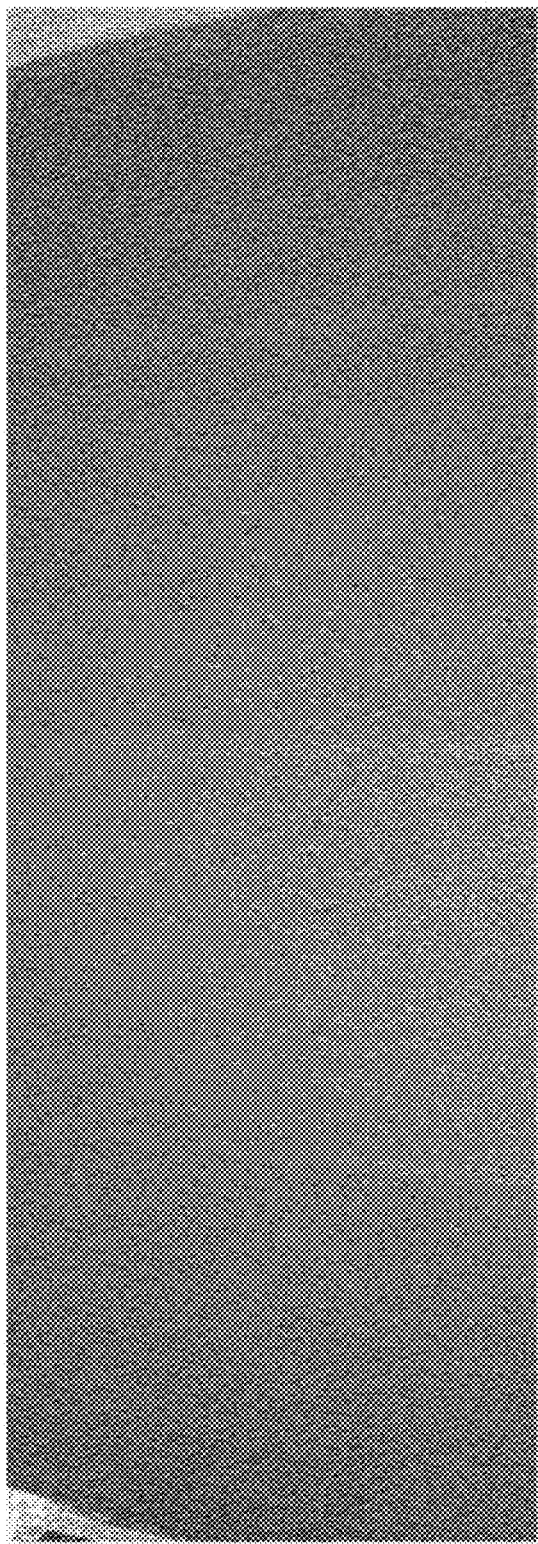

(51) Int. Cl.
  *B32B 5/02* (2006.01)
  *B32B 25/04* (2006.01)
  *B32B 25/10* (2006.01)
  *B60N 3/04* (2006.01)
  *D04H 1/4326* (2012.01)
  *D04H 18/02* (2012.01)

(52) U.S. Cl.
  CPC .............. *B32B 25/10* (2013.01); *B60N 3/042* (2013.01); *B60N 3/048* (2013.01); *D04H 1/4326* (2013.01); *D04H 18/02* (2013.01); *B32B 2255/02* (2013.01); *B32B 2255/26* (2013.01); *B32B 2262/02* (2013.01); *B32B 2307/718* (2013.01); *B32B 2471/02* (2013.01); *B32B 2605/003* (2013.01); *D10B 2331/06* (2013.01); *D10B 2505/12* (2013.01)

(58) Field of Classification Search
  CPC ..... B32B 25/04; B32B 25/10; B32B 2255/02; B32B 2255/26; B32B 2262/02; B32B 2307/718; B32B 2471/02; B32B 2605/003; B32B 2260/021; B32B 2605/00; B32B 5/06; B32B 5/18; B32B 5/245; B32B 5/26; B32B 2260/048; B60N 3/042; B60N 3/048; D10B 2331/06; D10B 2505/12
  USPC ......................................................... 442/402
  See application file for complete search history.

(56) References Cited

FOREIGN PATENT DOCUMENTS

| | | | |
|---|---|---|---|
| DE | 3904526 | A1 | 8/1990 |
| DE | 202009000775 | U1 | 4/2009 |
| DE | 102018101321 | B3 * | 12/2018 ............. B60N 3/048 |
| JP | 2000080551 | A | 3/2000 |
| JP | 2002363849 | A | 12/2002 |
| WO | 2011045691 | A1 | 4/2011 |
| WO | 2011065851 | A1 | 6/2011 |
| WO | 2018210852 | A1 | 11/2018 |

OTHER PUBLICATIONS

Japanese Notice of Reasons for Refusal dated Nov. 9, 2023 in corresponding Japanese Application No. 2021-540794, translated, 5 pages.

* cited by examiner

MOTOR VEHICLE FLOOR COVERING, BOOT OR TRUNK COVERING OR LOAD COMPARTMENT COVERING HAVING A STRUCTURALLY NEEDLE-PUNCHED CARPET SURFACE

CROSS-REFERENCE TO RELATED APPLICATIONS

This application is a U.S. National Stage application of PCT/EP2020/050378 filed Jan. 9, 2020, pending, which claims priority to German Application No. 10 2019 100 916.2 filed Jan. 15, 2019, the entire disclosures of which are hereby incorporated by reference in their entireties.

The object of the invention is a method of manufacturing a three-dimensionally shaped floor paneling, luggage compartment paneling or load floor paneling for motor vehicles, the carpet surface of which has a needled structure on the visible side, as well as the paneling themselves.

The surface material for a motor vehicle itself is a flat needled non-woven carpet, which may have several underlayers as well as foam or fibre/nonwoven insulation towards the chassis.

Especially due to the development of e-vehicles, design/styling is looking for alternative solutions in the deformable carpet surface compared to plain, smooth flat needled non-woven material, velour and tufted carpet.

In the case of motor vehicles with rear doors (station wagons) and fold-down rear seat backs, this styling also applies in particular to the luggage compartment and the loading floor, since when the rear door is open and the rear seat backs are folded down, one looks from the rear into the interior of the motor vehicle which is thus released. Both the luggage compartment and the passenger compartment must then embody a uniform, coherent styling.

In the state of the art, various designs of carpet uppers for motor vehicle floor paneling, luggage compartment paneling and load floor paneling are known, namely in particular tufted, velour and flat needled non-woven carpets.

For tufted carpets, PA6.6, PA6, PP, rPA and PET, rPET as well as the corresponding biobased polyamides (PA 5.10; PA 6.10) are used in particular; and for the velour and flat needled non-woven carpets, PET, PET/PP, PP, PA/PET and rPET are mainly used as yarn/fibre material.

In the prior art, processes for the production of velour carpets are known, see among others DE 44 09 771 A1, DE 29 00 935 C2 and DE 10 2008 026 968 A1.

A non-woven velour is a refined needled in which a fibre pile has been created in a prefabricated non-woven material by means of needling in a running homogeneous brush belt. If this is then sheared to a defined pile height, it is called a sheared velour.

A velour carpet differs from a needled non-woven carpet in that it has a higher-quality look and feel, as well as an improved wear behaviour.

For homogenisation of the stitch pattern in a needled non-woven material, special processes are described in U.S. Pat. No. 9,567,698 B2, US 2016/0069006 A1I, U.S. Pat. No. 9,260,806 B2, US 2015/0259836 A1 and EP 2 918 719 A1. In the production of a flat needled non-woven material, staple fibres are reinforced after formation of a non-woven material by means of carding and cross lapping via multiple needling between two metal plates. In a further work step, by means of repeated needling in a brush belt, a velour needle fleece can be produced from this flat needled non-woven material. For both variants, it is necessary to thermally or chemically bond the staple fibres after needling to achieve good final strength.

The fibres are mostly incorporated by means of foamed latex or acrylate. A combined use of latex or acrylate and BiCo fibre (coPET/PET bicomponent fibre) is also common in practice. Furthermore, the integration is also realised exclusively via BiCo fibre.

WO 2017/061970 A1 specifically deals with the binding of the carpet using bicomponent (BiCo) fibres. Here, the optimisation of the (BiCo) fibre fixation by using special slot nozzles in the drying oven is described. In addition, the following are known: spread PE, EVA/PE mixture, extruded PE, films, hot glue, thermoplastic dispersions and thermo bonding (EP 1 598 476 B1).

DE 2 008 439 C [U.S. Pat. No. 3,755,055] describes a method in which a monochrome or melanged nonwoven web and a nonwoven web printed on one side with pigment dyes with an ornamental pattern in one or more colours are laid on top of one another, wherein the printed side of one nonwoven web being turned away from the unprinted nonwoven web, and then both nonwoven webs are needled through from the unprinted surface to such an extent that the fibres of the unprinted nonwoven web mix with the fibres of the printed nonwoven web to form a pile on its printed surface and its printed ornamental pattern is changed to a soft and three-dimensional pattern.

DE 39 04 526 A1 discloses a floor covering and a method for its production. For the production of a floor covering consisting of two layers of needled non-woven material, of which the top layer is structured on its upper side, the bottom layer is needled into the structured top layer from the underside thereof. The depth of the needling is much less than the thickness of the top layer. By needling the two layers together from the back of the top layer, the structure of this top layer is not destroyed. After needling, the two layers are additionally joined by impregnating them with a bonding agent through the top layer.

In EP 0 888 743 A1 [US 2002/0029445 A1, U.S. Pat. No. 6,287,407 B1, U.S. Pat. No. 6,398,895 B1], a structured textile material made of at least two different non-woven base materials for the field of cleaning textiles is described. The technical teaching relates to a structured textile material made of at least two different needled non-woven base materials, wherein the non-woven base materials have a structure obtained by needling from at least one side, wherein the needles used for structure needling are fork or crown needles and the depth of the forks or the beards, respectively, is selected such that they are completely filled with fibres of the non-woven base material facing the needles when the needles are pierced, and wherein the textile material has unmixed, pure fibres in the pattern, in the base and on the reverse side. In the method for producing the structured textile material, it is stated, on the one hand, that a lamination of the two needled non-woven base materials comprising melt fibres is carried out without activating the melt fibres, that a one-sided or two-sided structural needling is then carried out, and that the melt fibres of the non-woven base materials are activated after the structural needling; and, on the other hand, in that, prior to entry into a structural needling machine, an intermediate layer of a material capable of bonding the two non-woven base materials, in particular a non-woven adhesive, is introduced between the two needled non-woven base materials having melt fibres, in that the two non-woven base materials and the intermediate layer are subjected to one-sided or two-sided structural needling, and in that the bond between the two non-woven base materials and the intermediate layer is then produced by activation of the melt fibres and the intermediate layer.

WO 2011/045691 A1 describes a graphic velour carpet and its production. Two structuring machines, each equipped with 2 needle boards, and a non-woven base material and a non-woven top material are used. The non-woven base material is fed onto the non-woven top material between the two structuring machines and needled into a non-woven material in the second structuring machine. The needles in the needle boards are arranged according to predetermined patterns. An adhesive is applied to the non-woven base material, which then fixes/bonds the fibres of the non-woven material layers.

Furthermore, it is known to create patterns in a needled non-woven material by means of several components, fibre layers and several needling processes, see among others DE 103 46 473 A1 and WO 2011/065851 A1.

DE 20 2009 000 775 U1 describes a fibre surface structure consisting of a needled nonwoven material or fibre pile (surface layer) on the visible side and a fibre pile or fibre nonwoven material (pattern layer), which are joined together by needling by means of different needle types/needle sorts and/or needle arrangements and/or penetration directions and/or penetration depths. The pattern layer is pre-processed, the pattern layer differs from the surface layer in the fibres themselves and the fibre colouring; also, the pattern layer has been punched and/or cut out before needling with the surface layer; and is dyed and/or printed. Furthermore, several different sample piles or sample nonwoven materials are used as the sample layer. The surface layer is back-needled and surface-treated.

All "structure-needled" applications, processes and devices as well as material structures described in the prior art concern non-(single-layer) flat needled non-woven carpets for use in motor vehicles, their three-dimensional deformation into motor vehicle floor paneling, luggage compartment paneling or load floor paneling. There are no reports of a non-destructive structure that retains its surface structure in a durable manner during three-dimensional deformation in the contact heating field (laminating press), radiant heating field and in the deformation tool itself.

The object of the present invention with respect to the aforementioned prior art is thus to provide a deformation-appropriate structurally needled carpet which upgrades the passenger compartment and/or luggage compartment and/or load compartment of motor vehicles to the effect that the latter has a "living room/well-being atmosphere". In particular, it is an object of the invention to introduce a permanent, hard-wearing surface pattern with a possibly three-dimensional structure during the production/needling of a needled non-woven carpet, which is structured differently across the width of the carpet surface and withstands a three-dimensional deformation to form a motor vehicle floor or luggage compartment paneling.

In a first embodiment, the subject matter of the present invention is a method for producing a three-dimensionally deformable needled non-woven carpet for a floor paneling, luggage compartment paneling or load floor paneling of a motor vehicle with a structurally needled, deformation-resistant surface having a grammage of the paneling in the range from 180 g/m2 to 700 g/m2, which is characterized in that two or more needle types are arranged in segments across the width of a needle board, wherein
with a defined setting of the feed/stroke of the initial non-woven material as well as a defined setting of the penetration depth, the structured paneling surface from the initial non-woven material by needling is produced, and the paneling is provided with one or more underlayers and is deformed.

The core of the present invention is thus the provision of a needled non-woven carpet produced in a conventional standard process for the manufacture of a floor paneling, a luggage compartment paneling or a load floor paneling of a motor vehicle with a structurally needled, deformation-resistant visible surface solely by the arrangement of different needles/needle geometries across the width of the needle board and/or the needle boards which are used for needling the floor paneling, the luggage compartment paneling or the load floor paneling of a motor vehicle. The needle boards are equipped across the width with predefined needle types/geometries, which thus create a predefined, possibly three-dimensional structure of the needled non-woven material surface. Preferably, needles of the same length but with different fineness, notch spacing, notch size, working part geometry and distance from tip to first notch are used.

The advantage of the present invention is to provide deformation-resistant/stable, structurally needled non-woven carpet for the production of motor vehicle floor and luggage compartment paneling or load floor paneling without an additional working step in its production compared to standard needled non-woven carpet production.

The initially produced roll or blank fabric has, for example, areas of different fluffiness or stiffness in the machine direction.

The method of the present invention can be implemented-without additional non-woven layers, needling stages, needling machines or needle boards-in "standard" installations solely by the needle geometry/needle type of the needles arranged across the width of the needle board.

A further embodiment of the present invention consists in a three-dimensionally shaped needled non-woven material of a floor paneling, a luggage compartment paneling or a loading floor paneling of a motor vehicle with a structurally needled, deformation-resistant surface with a grammage of the paneling in the range from 180 g/m2 to 700 g/m2, further comprising one or more underlayers, wherein the visible side of the floor paneling, the luggage compartment paneling or the loading floor paneling has an optionally three-dimensional structurally needled, hard-wearing surface.

The realisation should preferably take place on the one hand with a single-layer and on the other hand with a two-layer needled non-woven carpet. In the case of a two-layer design, additional colour effects with different structures can be needled in.

EXAMPLE OF EXECUTION

For the production of a deformation-resistant/stable, structure-needled floor paneling, a pre-non-woven material made of 7 dtex 100% PES fibres with a length of 64 mm was used as the initial non-woven material; the grammage was 400 g/m2.

The needle board was divided into four different segments in the transverse direction:

Needle type Mine)—Needle type 2 (coarse)—Needle type 1 (fine)—Needle type 2 (coarse)

Commercially available needles from Groz-Beckert KG, Albstadt, Germany were used:
Needle type 1: 15×18×43×3 R222 G 2017
Needle type 2: 15×18×36×3 R333 G 2007
These needles differ in fineness, number of notches, notch size and distance from tip to first notch.

During production, it was necessary to find the optimum penetration depth and the optimum feed/stroke by trial and error. For the needled non-woven carpet shown in FIG. 1, the feed/stroke was 1.55 mm/stroke and the penetration depth 12 mm.

The structurally needled non-woven carpet floor produced in this way was then bound with 80 g/m2 of commercial latex and coated with 80 g/m2 of commercial PE.

Subsequently, the needled non-woven carpet floor with the underlayers (a) heavy foil 2.5 kg/m2 and (b) a non-woven foil 150 g/m2 was formed into a floor paneling upper product of a mid-range vehicle at the process parameters contact heating field 185° C./180° C., 58 sec; radiant heating field 150° C. and a tool closing time of 68 sec at the mould surface temperature of 5° C.

Figure 2:
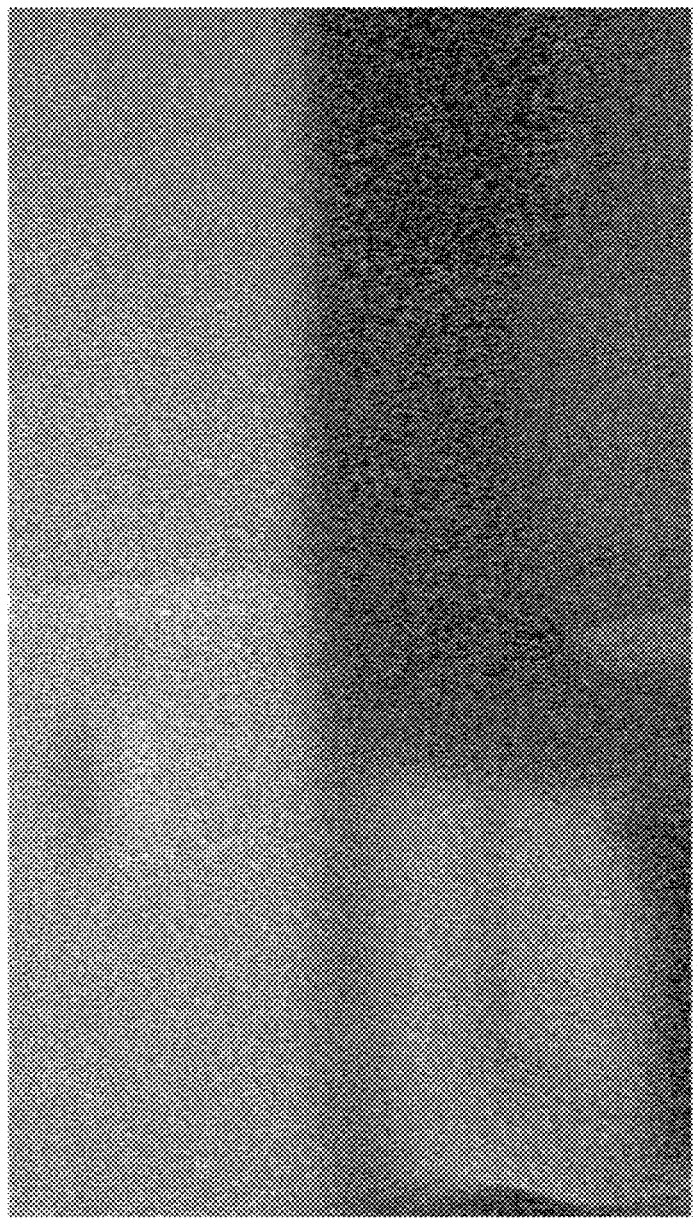

FIG. 2 shows a section of the formed floor paneling upper product. The structuring, fine needle=fluffy, coarse needle=stripy, is clearly visible. The strip in between was only pre-needled.

Specifically in FIG. 2, it can be seen that the structural needling of the carpet is deformation-appropriate and deformation-stable.

By choosing the needle combinations, one could combine the carpet texturing in different ways.

Figure 3:
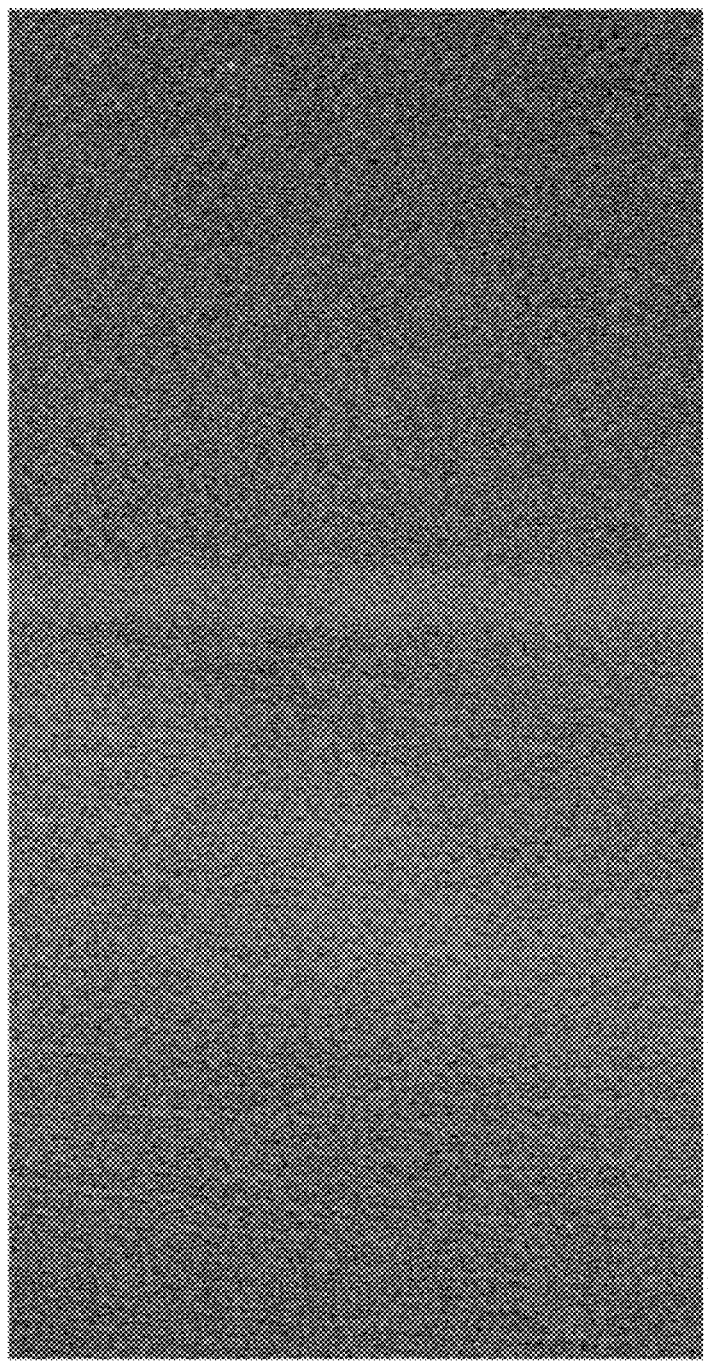

FIG. 3 shows another example of this:

Needle type 1: 15×25×32×$3_{1/2}$ R333 G3012

Needle type 2: 15×20×$3_{1/2}$ C333 G3012

Feed/stroke: 7.99 mm/stroke

Penetration depth: 12 mm

The invention claimed is:

1. A method for the production of a three-dimensionally shaped needled non-woven carpet for a floor paneling, luggage compartment paneling or load floor paneling of a motor vehicle with a structurally needled, deformation-resistant surface having a grammage of the paneling in the range from 180 g/m$^2$ to 700 g/m$^2$, characterized in that
    two or more needle are arranged in segments across the width of a needle board,
    wherein
        with a defined setting of the feed/stroke of the initial non-woven material as well as a defined setting of the penetration depth, the structured paneling surface from the initial non-woven material is produced,
        the paneling is provided with one or more underlayers and is deformed;
    the needle board is divided into different segments in a transverse direction, wherein alternating a first needle type and a second needle type is arranged in segments; and
    the first needle type is a needle type 15×18×43×3, R222 G 2017 and the second needle type is a needle type 15×18×36×3, R333.

2. The method according to claim 1, characterized in that needles are used which differ in fineness, notch spacing, notch size, working part geometry, and distance from tip to first notch.

3. The method according to claim 1, characterized in that the needle board is divided into four different segments, needle type 1 fine, needle type 2 coarse, needle type 1 fine, needle type 2 coarse, in a transverse direction.

* * * * *